Oct. 8, 1957    M. CAWEIN    2,809,298
AUTOMATIC SELECTOR SYSTEM
Filed Feb. 26, 1954    2 Sheets-Sheet 1
FIG. 1.
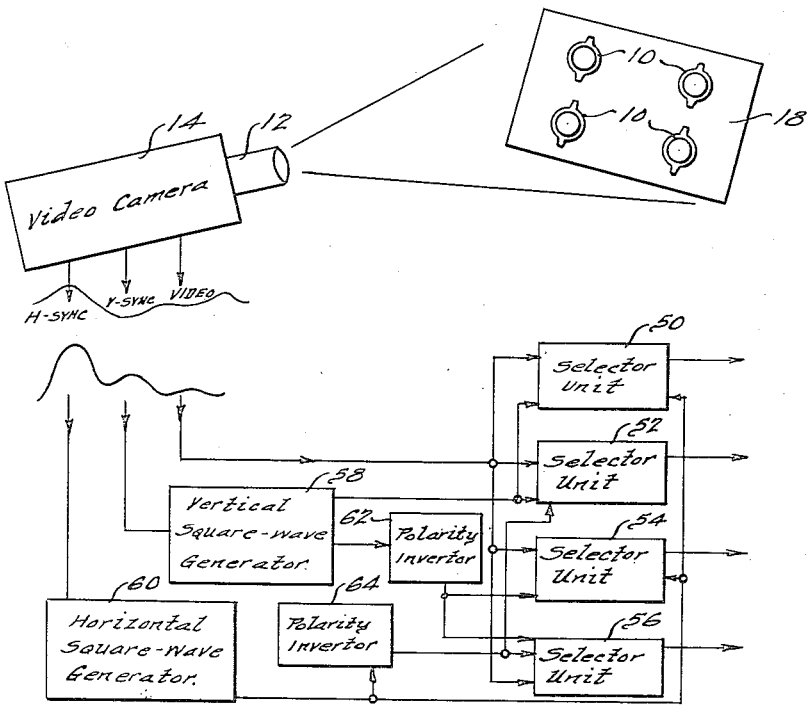
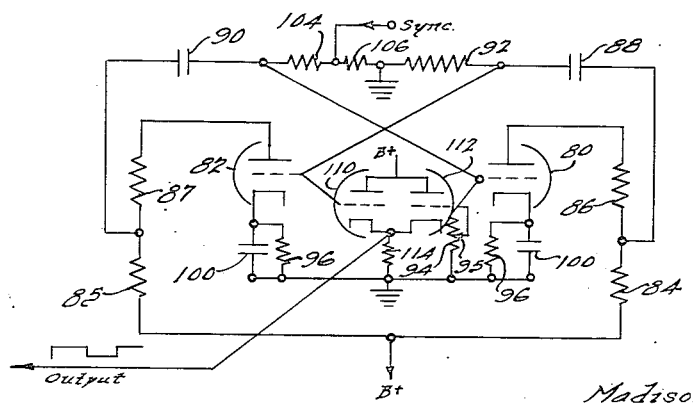
FIG. 2.
INVENTOR.
Madison Cawein.
BY
Harness, Dickey & Pierce
ATTORNEYS.

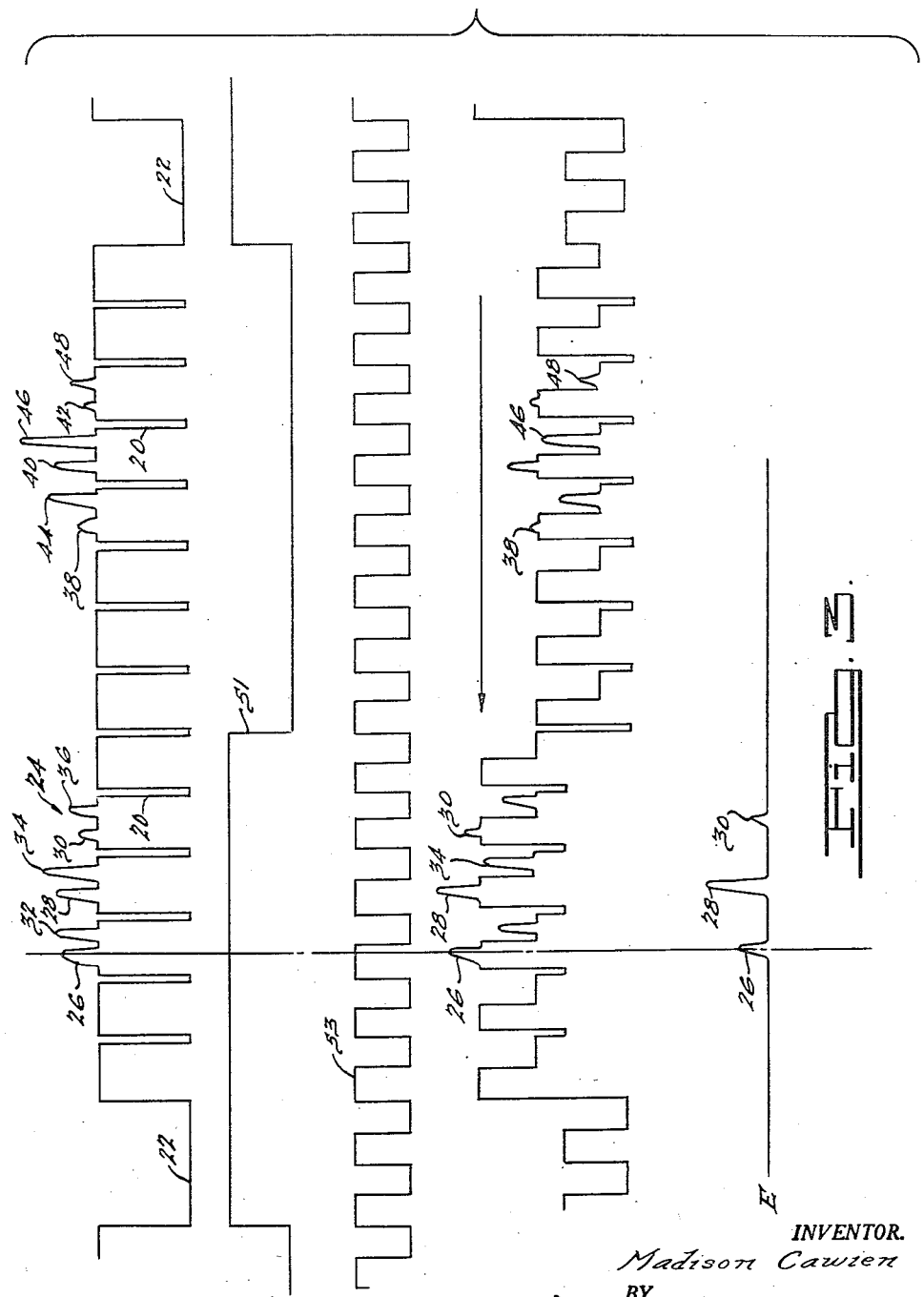

United States Patent Office 2,809,298
Patented Oct. 8, 1957

2,809,298

AUTOMATIC SELECTOR SYSTEM

Madison Cawein, Fort Wayne, Ind., assignor to Diamond Power Specialty Corporation, Lancaster, Ohio, a corporation of Ohio Application February 26, 1954, Serial No. 412,828

8 Claims. (Cl. 250—214)

The present invention relates to a signal selecting system and more particularly to a video monitoring and selector system for selecting and separating video signals in accordance with the spatial display of luminous subjects in a monitored area.

It is frequently necessary or desirable to maintain constant surveillance of automatic equipment to insure the proper functioning thereof. Since such equipment generally includes a plurality of instruments, control devices and other indicating expedients, it is usually necessary for a standby operator to divide his attention among the several devices. However, at times, due to inadvertence, negligence, or otherwise, as when his attention is directed to a particular instrument, an operator fails to notice a change in the operation of the apparatus as indicated by a second instrument. Such a change, if not immediately corrected, may result in a disruption of the apparatus with ensuing delay and expense. Furthermore, in some instances the continuous presence of an operator is impractical, as where the control devices and indicating means are inaccessible during the operation of the equipment, or economically unjustifiable where many steps, products, etc., must be constantly observed.

The present invention concerns an automatic selector system for use with automatic equipment or the like in instances such as cited above and wherein the control devices or other indicating expedients under surveillance are capable of providing a source of illumination and wherein the intensity level of such sources of illumination will provide a distinctive indication of an operation or process. Such use may include the observation of luminous phenomena such as flame conditions in boiler furnaces, flaw detection in an inspection process, automatic marking of articles, control means for a machine, process or in any situation wherein distinctive indications are provided by changes in the intensity level of illumination.

Broadly, the selector system of the instant invention includes a video monitoring unit which is focused upon a plurality of monitored indicating means and produces an electrical signal output having signal components therein corresponding to each indicating means being monitored and the spatial position of the indicating means in the monitored area. This electrical signal output is combined with suitable generated electrical pulses for selecting and separating the signal components corresponding to individual indicating means. Depending upon the intensity level of illumination of each indicating means, and hence the amplitude level of the signal components, one or several of a plurality of control or warning circuits are actuated for either controlling the operation of the associated apparatus or providing a distinct indication of such operation.

Accordingly, an object of the present invention is the provision of improved means for selecting video signals in accordance with the spatial display of luminous subjects in a monitored area.

Another object of the present invention is the provision of improved means for separating video signals in accordance with the spatial display of luminous subjects in a monitored area.

A further object of the present invention is the provision of a signal selector system which is automatic in operation for selecting and separating video signals in accordance with the spatial display of one or $n$ luminous subjects in a monitored area.

Still another object of the present invention is a means for producing an output signal of the control or warning type in response to a change in amplitude level of a video signal.

A still further object of the present invention is the provision of a signal selector system providing one or $n$ output signals for producing one or $n$ control signals of the warning or control type whenever either one or $n$ luminous subjects has its intensity level of illumination changed.

Other objects, features and advantages of the invention will become apparent to those skilled in the art from the following detailed description of a preferred embodiment of the invention as illustrated in the accompanying sheets of drawings in which:

Figure 1 is a block diagram showing a typical installation of an automatic selector system embodying features of the present invention;

Fig. 2 is a schematic diagram showing a square-wave generator circuit employed in the instant invention; and Fig. 3 shows various types of wave-forms found in the different circuits of the present invention.

Referring now to the drawings, wherein like reference characters designate like or corresponding parts throughout the several views, there is shown in Figure 1 a plurality of luminous areas or subjects 10 which are to be monitored and which for purposes of illustration only, are shown as "bull's eye" type observation windows in a boiler furnace. It will be apparent that the monitored subjects may include products, an inspection step, instruments, control devices and other means which provide a varying intensity level of illumination as an indicating medium. Focused upon the luminous areas 10 is a suitable industrial or other television or video camera 14. The camera 14 is positioned adjacent the luminous areas with its lens 12 focused upon the luminous areas 10 in a field of view or scene 18. The luminous areas are preferably arranged in scene 18 such that the scene may be divided into a number of sections each of which includes a single luminous area. In a video camera employing the rectilinear scanning system, the areas are preferably rectangles, such as is shown in Figure 1, with the luminous areas being orderly arranged therein, as for example, one in each quadrant thereof. It will be understood that the number of luminous areas contained within the scene may vary from one to $n$; the number being a matter of choice under the particular circumstances involved in the application of the instant invention.

The luminous areas are received in the video camera 14 and converted, in a conventional manner, to an electrical video signal having components therein representing each of the luminous areas. This video output from the camera is appropriately superimposed with suitable blanking and synchronizing pulses in the camera unit for producing a composite video signal in its output of which a single frame is shown in Fig. 3A. The composite signal generally includes a plurality of horizontal blanking pulses 20, vertical blanking pulses 22 and the video signals 24 interposed between the horizontal blanking pulses 20 on the composite signal. The video signals 24, which carry the video intelligence of the luminous areas under surveillance include video signal pulses of varying amplitude. The amplitude level of these video signal pulses as well as the relative position of the pulses in a signal frame will depend upon the intensity level of illumination of the luminous areas and the spatial position of the luminous areas in the scene.

In order to clearly show the relation between the spatial position of a luminous area in a scene and the composite video signal, reference is made specifically to Fig. 3A. Since each horizontal blanking pulse 20 functions to blank out the scanning beam in a video apparatus during the return of the sweep voltage which occurs after the scanning of a horizontal line, the video signal picked up during the horizontal sweep will be carried between these blanking pulses in proper time sequence. Upon return of the sweep voltage, the scanning beam is again deflected across the scene but on a line slightly lower in space to the preceding line. Due to the slight spacing between these succeeding lines, several lines may contain video signals of the same object and should several subjects be contained in the scene and scanned during a single sweep across the scene, a like number of video signals will be produced between each pair of horizontal blanking pulses. As such, in the reproduction of a full scene, as in Fig. 3A, the video signal pulses 26, 28 and 30 positioned between successive blanking pulses 20, defining a scanning sweep, will represent the image of the luminous area positioned in the upper left quadrant of scene 18 while the video signal pulses 32, 34, and 36 will represent the image of the luminous area positioned in the upper right quadrant of the scene. Similarly, the video signal pulses 38, 40 and 42 found in the latter part of the single frame will represent the image of the luminous area positioned in the lower left quadrant of the scene while the video signal pulses 44, 46 and 48 will represent the image of the luminous area positioned in the lower right quadrant of the scene.

The composite signal output from the video camera 14 is fed directly to a plurality of similar selecting units 50, 52, 54 and 56. Each of these selecting units includes a mixing amplifier and a clipper or limiter circuit for reasons hereinafter set forth. Also, horizontal and vertical synchronizing pulses derived from the horizontal and vertical synchronizing circuits of the video camera 14 are fed from the camera to a plurality of square-wave generators, the number of which varies with the number of luminous areas in a monitored scene and hence, the number of video signal pulses the system is to separate and select. In the illustrated embodiment of the invention wherein four luminous areas or subjects are present in scene 18, two square-wave generators are provided which include a cross-lock vertical square-wave generator 58 and a cross-lock horizontal square-wave generator 60. The vertical synchronizing pulses from the video camera 14 are fed to the vertical generator 58 and the horizontal synchronizing pulses from the video camera are fed to the horizontal generator 60. These synchronizing pulses, as will hereinafter be described, are effective to provide a time reference base for the square-wave outputs from generators 58 and 60, relative to the composite signal output from the camera 14.

The vertical square-wave generator 58 functions to provide a square-wave output, as indicated in Fig. 3B, having a frequency equal to the frequency of the raster or frame and thus produces a square-wave 51 with a pulse width having a time duration equal to one half of a single frame. Due to the vertical synchronizing pulses which are fed from the camera 14 to generator 58, each square-wave generated has the same time reference base as the raster or frame. Similarly, the horizontal square-wave generator 60 functions to provide a square-wave output having a frequency equal to the horizontal scanning sweep, defined by the blanking pulses 20, and thus produces a square-wave 53 with a pulse width having a time duration equal to one half of a single horizontal scanning sweep. As in the vertical square-wave generator 58, the horizontal synchronizing pulses from the camera 14 serve to fix the time reference base of square-waves 53 with the time base of the scanning sweep.

Fig. 2 discloses a square-wave generating circuit which may be employed as the cross-lock square-wave generators 58 and 60. This generator circuit includes a plate-coupled multivibrator circuit adapted to generate square-waves in its output, and a cathode-follower stage serving to couple the square-wave generator with a forward stage of the selector system.

Referring more particularly to Fig. 2, the multivibrator circuit includes a pair of electronic tubes 80 and 82, preferably of the triode type, having a cathode, an anode and a control grid. A source of direct current or B+ potential is applied to the anode of each of the tubes through a pair of plate load resistors 84 and 85 and a pair of voltage dropping resistors 86 and 87, respectively. The output from each of the tubes 80 and 82 is taken across its respective load resistor and fed through a resistance-capacitance coupling circuit to the control grid of the other tube. Each coupling circuit, between the respective tubes 80 and 82, comprises a coupling capacitor 88 and 90 and a grid resistor 92 and 94, respectively. Grid resistor 94 associated with tube 80 is provided with a variable tap 95 for reasons hereinafter explained. Since the signal applied to the grid of each tube is reversed in phase with respect to its output, the output of the first of said tubes is in phase with the input of the second tube. Hence, since the signal in the output of the first tube is of proper polarity to reinforce the signal applied to the second tube, oscillation may take place. The frequency of such oscillations will depend upon the values of the individual components of the circuits and largely, upon the value of capacitors 88 and 90 and resistors 92 and 94 comprising the coupling circuits between the two tubes.

In order to improve the frequency control and stabilization of the multivibrator circuit, a cathode biasing arrangement, including cathode biasing resistors 96 and by-pass capacitors 100, is connected between the cathodes of tubes 80 and 82 and ground. By utilizing a cathode biasing arrangement in the generator, an adjustable positive bias is applied to the tubes for shortening the conduction time of a tube with an increase in cathode bias such that the instantaneous grid potential of the tube reaches a cut-off value earlier in its conduction period and also, for changing the slope in the curve of the instantaneous grid potential relative to the grid cut-off bias.

The square-wave generator is synchronized with the camera 14, by applying a synchronizing pulse to the grid of tube 80 from the video camera by means of a recoupling network, comprising resistors 104 and 106, connected between the control grid and ground. The action of the synchronizing pulse is such that when the tube 80 is triggered, the instantaneous bias on the tube is changed, rendering the tube conductive or non-conductive depending upon the operative condition of the tube at that instance. This triggering action by the synchronizing pulses from video camera 14 forces the generator in step with the video camera synchronizing circuit whereby the time reference base of the generator and video camera are made the same.

The square-wave output from the generator is taken from the resistance-capacitance coupling circuits of tubes 80, 82 and fed to a pair of electronic tubes 110 and 112, preferably of the triode type, in the cathode-follower circuit. A direct current or B+ potential is applied directly to the anode of the tubes 110 and 112 while the cathodes of the tubes are tied together and grounded through a load resistor 114. The input of tube 110 is taken directly from the coupling circuit while the input of tube 112 is taken from tap 95 on grid resistor 94. It will be noted that by varying tap 95, the R–C constant of the multivibrator circuit is changed which changes the frequency of the square-wave output. This adjustment is therefore employed to "hold" or adjust the operation of the multivibrator circuit.

The square-wave output from the cathode-follower circuit of the vertical square-wave generator 58 is taken across load resistor 114 and fed directly to a mixing amplifier of selector units 50 and 52. A second portion of the square-wave output from generator 58 is fed to a mixing amplifier in selector units 54 and 56 through a polarity or phase inverter circuit 62. The polarity inverter circuit employed in the selector system may comprise any conventional type of circuit for producing an output voltage having a 180° phase inversion with respect to the input voltage without distorting the waveshape of the input voltage and may include a conventional type transformer inverter, a vacuum tube phase inverter or the like. Similarly, the square-wave output from the cathode follower circuit of the horizontal generator 60 is fed directly to a mixing amplifier in selecting units 50 and 54. A portion of the square-wave output from the horizontal generator 62 is also fed to a polarity inverter circuit 64 which is similar in construciton to the polarity inverter 62. The inverter output wave from inverter 64 is fed to a mixing amplifier in selector units 52 and 56.

Each of the mixing amplifiers in selector units 50, 52, 54 and 56, which are of similar construction, function to combine the composite signal output from video camera 14 and the respective square-wave outputs from generators 58 and 60 to provide an output signal having an amplitude equal to the instantaneous sum of the composite signal and square-wave amplitudes fed thereto. These mixing amplifiers may comprise any conventional circuit capable of accomplishing the intended functions such for example, an heterodyning type of amplifier or the like.

As indicated above with respect to the circuit connections, the signal and wave outputs from the video camera and the square-wave generators are applied to the selector units in various combinations. Whenever input signals are applied to a selector unit from the video camera, vertical square-wave generator 58 and horizontal square-wave generator 60, having wave-forms as indicated in Figs. 3A, B and C, respectively, the mixer amplifier in the selector will combine these signals and produce in its output, a signal having a wave-form as indicated in Fig. 3D. It will be seen from this figure that the amplitude sum of the instantaneous video signal, the positive vertical square-wave, and the positive horizontal square-waves will provide an output signal in which the video signal pulses 26, 28 and 30, corresponding to the upper left luminous area in scene 18, have a greater positive excursion than the video signal pulses representing the other luminous areas. Also, it will be noted that the amplitude sums, during the second half of the respective scanning sweep, will only have an amplitude level equal to the sum of the amplitudes of video pulse signals 32, 34 and 36, respectively, and the instantaneous amplitude of the square-wave signal from the generator 58, since the square-wave output produced by generator 60 is at its low amplitude value during this interval. It will be further noted that the video pulse signals corresponding to the luminous areas or subjects positioned in a lower portion of the scene 18 are raised to a maximum amplitude equal to the horizontal square-wave and the video signal pulses inasmuch as no vertical square-wave is produced in the latter half of the frame.

Thus, it is readily apparent from the above that by combining the synchronized square-wave outputs from the cathode-follower circuits of the vertical and horizontal square-wave generators 58 and 62 with the composite video signal from camera 14, accentuated positive excursions of the video signal pulses may be obtained. By inverting the polarity of either one or both of the square-wave outputs in the polarity inverters 62 and 64 other combinations may be obtained, whereby accentuated positive excursions of the video signal pulses, corresponding to each luminous area or subject in a scene may be obtained. Hence, with the application of a different combination in each of the mixing amplifiers of the units 50, 52, 54 and 56, accentuated amplitude excursions of the video signal pulses representing a different luminous area or subject is produced in each selector unit.

It will be obvious to those skilled in the art that this method may be extended for the automatic selection of one or $n$ luminous areas or subjects. As an example, if a total of 16 luminous areas are found in scene 18 it is only necessary to provide two low frequency cross-lock square-wave generators operating at the frequency of the raster and twice the frequency of the raster, respectively, and two high frequency horizontal cross-lock generators operating at the frequency of the horizontal scanning pulses and twice the frequency of the horizontal scanning pulses respectively. By properly combining these outputs with the video signal in sixteen mixing selector units having five inputs each, it will be possible to select and separate the video pulse signals of each of the sixteen luminous areas or subjects. In each instance, the number of square-wave generators will be equal to the power of the base two with the number of signals to be selected being equal to the product thereof. As a further example, whenever thirty two signals are to be selected, it is only necessary to provide a total of five square-wave generators.

The signal output from an individual mixing amplifier is fed to a suitable amplitude limiter or clipper circuit associated with the mixer amplifier in the selector unit. Such a limiter or clipper circuit may comprise a series diode, a grid limiter, a cut-off limiter or the like. Preferably, the limiter is provided with suitable adjustable means for selectably adjusting the clipping level of the limiter stage. By adjusting the clipping level of the limiter stage, the limiter will operate to eliminate all but the accentuated video signal pulses from the mixing amplifier signal output as shown in Fig. 3D, producing the signal shown in Fig. 3E.

These clipped video signals obtained from the limiter circuits are fed to a suitable actuating circuit (not shown) which is responsive to the amplitude level of the input signal for producing a warning or control signal. Such a circuit may be the balanced bridge circuit as described in the copending application of William E. Martin, entitled Video Monitoring System, Serial No. 402,647, filed January 7, 1954, or the like.

By applying the video pulse outputs from each selector unit 50, 52, 54 and 56 to a bridge circuit such as described in the above identified application it is possible to obtain a control signal upon a change in the amplitude level of the video pulse signals and hence obtain a control signal whenever the intensity level of illumination changes in one or $n$ of the monitored luminous areas. This control signal, in turn, may actuate a relay mechanism or the like in an output circuit for controlling a warning device of the aural or visual type or a control mechanism associated with the monitored devices. Therefore, it will be appreciated that with the automatic selector system of the instant invention it is possible to obtain a control signal indicating the operation of one, or a combination of indicating expedients.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In an apparatus for selecting video signals in accordance with the spatial position of luminous subjects in a scene, a video viewing means directed towards said luminous subjects and operative to produce video signals corresponding to said luminous subjects, a plurality of square-wave generating means, each of said generating means producing square-waves of a predetermined frequency, synchronizing means for said generating means and said video viewing means for providing a time reference base for the video signals and said square-waves, inverter means connected to said generating means, said inverter means being operative for providing a polarity inversion of said square-waves, and a plurality of selector units connected to said video viewing means, each of said selector units being connected in different combinations with said generating means and said inverter means, whereby each of said selector units is operative to select the video signals corresponding to a different luminous subject.

2. In an apparatus for selecting video signals in accordance with the spatial position of luminous subjects in a monitored scene, a viewing means directed towards said area and operative to provide video signals of said luminous subjects, a plurality of square-wave generators, each of said square-wave generators being operable to produce square-waves of a predetermined frequency, synchronizing means for said viewing means and said generators, a polarity inverter connected to each of said generators and operative to produce a polarity inversion of an input wave, and a plurality of selector units connected to said viewing means, said generators and said polarity inverters being connected in different combinations with said selector units, each of said selector units including mixer means operative to combine the instantaneous amplitudes of said video signals and the output waves from the square-wave generators and polarity inverters connected thereto, whereby each of the selector units is operative to select the video signals corresponding to a different luminous subject.

3. In an apparatus as defined in claim 2 in which said selector unit includes limiter means for separating the selected video signals of a luminous subject from the combined video signal and generated waves.

4. An automatic selector system for selecting video signals in accordance with the spatial position of luminous subjects in a monitored scene, a video viewing means operative to provide video signals corresponding to said luminous subjects, a plurality of square-wave generators synchronized with said video signals and operative to produce square-waves in their outputs, inverter means connected to each of said square-wave generators, and a plurality of selector means connected to said video viewing means, said generators and said inverter means being connected to said selector means in different combinations such that each selector means is connected to at least one square-wave source, each of said selector means including a mixing amplifier means and a limiting means, said mixing amplifier means being operative to combine the instantaneous amplitudes of the video signal and square-waves fed thereto from the square-wave generators for selecting and amplifying the video signals corresponding to a predetermined luminous subject, said limiting means having adjustable clipping means for separating the selected video signals from the combined video signals and waves.

5. An automatic selector system for selecting video signals in accordance with the spatial position of luminous subjects in a monitored scene, a video camera having a lens directed towards said scene and operative to provide video signals corresponding to the luminous subjects in the scene, a pair of square-wave generators for producing square-waves of predetermined frequencies, said square-wave generators including a multivibrator having cathode biasing and a cathode follower output circuit, a decoupling circuit in said multivibrator, synchronizing means in said video camera connected to said decoupling circuit for providing a time reference base for said generated square-waves relative to said video signals, a polarity inverter connected to each of said square-wave generators, and a series of selector units each of which is connected to said video camera, a first of said selector units being connected to said square-wave generators, a second of said selector units being connected to a first of said generators and to a second of said polarity inverters, a third of said selector units being connected to a second of said generators and to a first of said polarity inverters, and a fourth of said selector units being connected to each of said polarity inverters, each of said selector units having a mixing amplifier and a limiter circuit, said mixing amplifier being operative to combine the instantaneous amplitudes of said video signals and the input waves from its respective generator and inverter input source for selecting the video signals corresponding to one luminous image, said limiter circuit being operative to separate said selected video signals from the combined video signals and square-waves.

6. An automatic selector system as defined in claim 5 but further characterized by an output circuit means connected to said limiter circuit for producing a control signal upon a change in the amplitude level of the selected video signal.

7. An automatic selector system for selecting video signals in accordance with the spatial position of luminous subjects in a monitored scene, a video camera means having a lens means directed towards said area and operative to produce video signals corresponding to each of said luminous subjects, said video signals having amplitudes which vary in accordance with the intensity level of illumination of said luminous subjects, a plurality of square-wave generators operative to produce square-valves of predetermined frequencies, said generators being synchronized with said video camera means, inverter means connected to each of said square-wave generators, and a plurality of selector means connected to said video camera means, said square-wave generators and said inverter means being connected to said selector means in different combinations, said selector means including mixing and limiter means for combining the instantaneous amplitudes of said video signals and square-waves to select and separate the video signals corresponding to individual luminous subjects, and an output means connected to each of said selector means responsive to a change in the amplitude level of the selected video signals for providing a control signal adapted to actuate an auxiliary circuit means.

8. An automatic selector system as defined in claim 7 in which said square-wave generators comprise a multivibrator circuit including a cathode biasing means and a cathode-follower coupling circuit.

References Cited in the file of this patent

UNITED STATES PATENTS 2,164,297    Bedford _____ June 27, 1932
2,240,420    Schnitzer _____ Apr. 29, 1941